Feb. 21, 1933.         J. P. FERRIS         1,898,576
                       BROACHING MACHINE
                     Filed Nov. 21, 1927        3 Sheets-Sheet 1
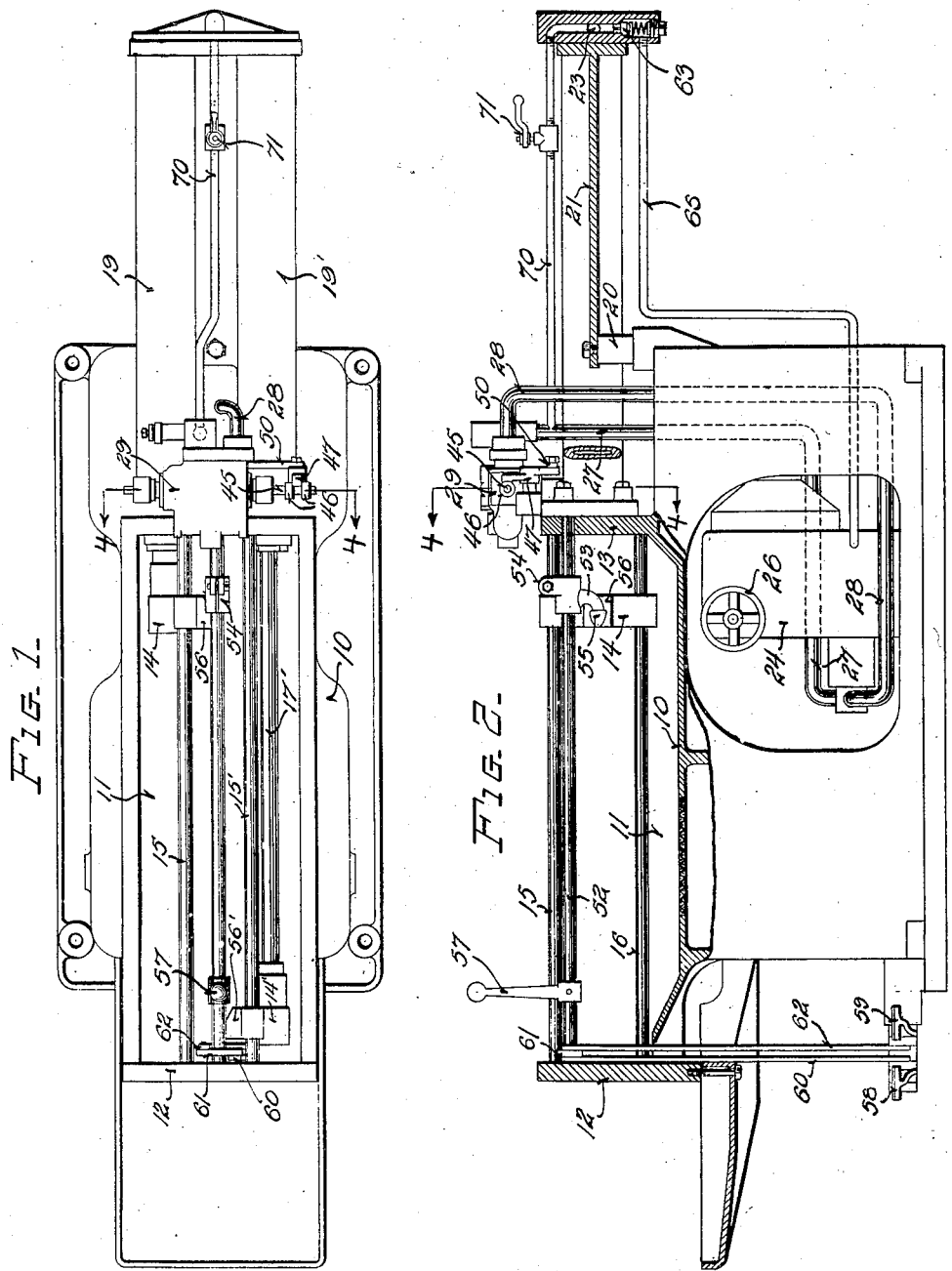
INVENTOR.
John P. Ferris
BY
Ralph W. Brown
ATTORNEY.

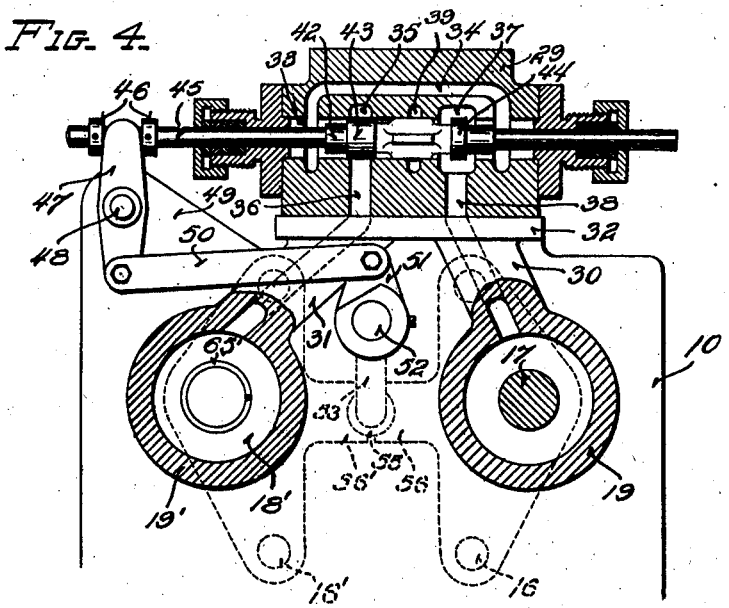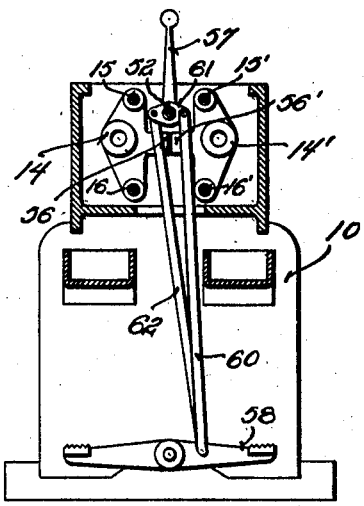

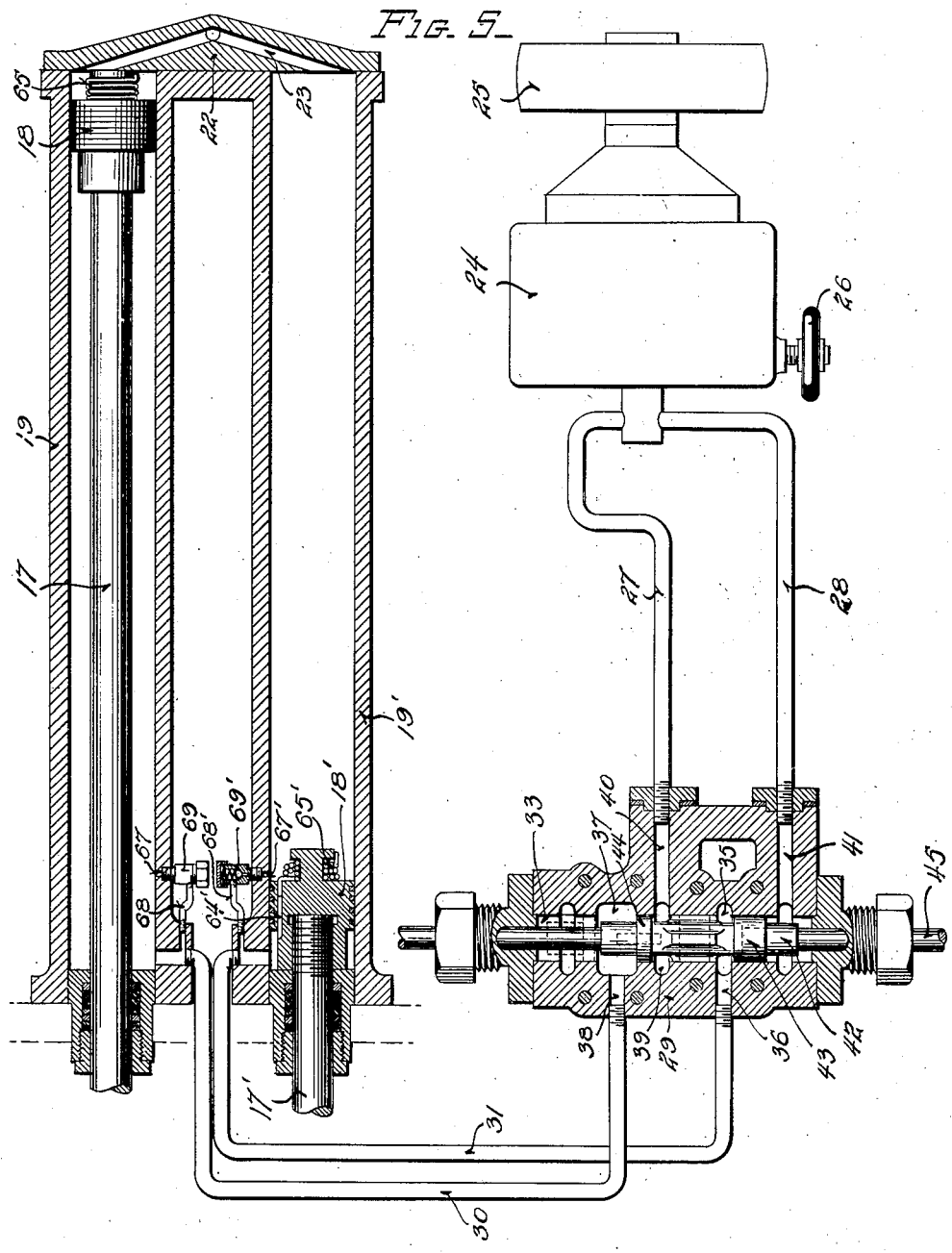

Patented Feb. 21, 1933

1,898,576

UNITED STATES PATENT OFFICE

JOHN P. FERRIS, OF MILWAUKEE, WISCONSIN, ASSIGNOR TO THE OILGEAR COMPANY, OF MILWAUKEE, WISCONSIN, A CORPORATION OF WISCONSIN

BROACHING MACHINE

Application filed November 21, 1927. Serial No. 234,621.

This invention relates to double spindle broaching machines.

One object of the present invention is the provision of a hydraulic drive for double spindle broaching machines capable of operating the broaching tools at predetermined speeds and without jerk or jar.

In double spindle broaching machines the cutting strokes of each spindle alternate with those of the other, and each spindle ordinarily performs a return stroke during the cutting stroke of the other. This operating relation between the spindles is readily maintained in double spindle machines, heretofore designed, by reason of the positive nature of the mechanical drives heretofore universally employed. In the application of a hydraulic drive to a machine of this type however some difficulty is experienced in maintaining a proper working relation between the spindles on account of unavoidable leakage and consequent slip inherent in hydraulic drives. Another object of the present invention is the provision in a hydraulic drive for the purpose mentioned of means automatically operable to insure and maintain proper operating sequence between the spindles.

Other objects and advantages will appear from the following description of an illustrative embodiment of the present invention.

In the drawings:—

Figure 1 is a view in plan of a double spindle broaching machine equipped with a hydraulic drive embodying the present invention.

Fig. 2 is a side elevation, partly in section, of the machine shown in Figure 1.

Fig. 3 is a transverse sectional view of the machine including a vertical longitudinal section of the control valve.

Fig. 4 is a sectional view, on a somewhat larger scale taken along the line 4—4 of Figures 1 and 2, and including a vertical sectional view of the control valve.

Fig. 5 is a diagram of the hydraulic circuit including horizontal sectional views of the main cylinders and of the control valve.

The broaching machine selected for illustration includes a hollow base frame 10, supporting an integral trough 11 closed at one end by the usual vertical face plate 12, thru which the tools are reciprocated, and at the other end by a vertical plate 13. Two tool-operating draw-heads 14 and 14', each mounted upon a pair of vertically spaced guide rods 15—16 and 15'—16', fixed within the trough 11, reciprocate longitudinally thereof. The draw-heads are equipped with tool holders of conventional type and are actuated by piston rods 17—17', projecting through the plate 13 and fixed to pistons 18—18' reciprocating in cylinders 19—19'. The cylinders 19—19' are bolted at their inner ends to the plate 13 and are further supported intermediate their ends by a post 20, which rises from the frame 10 and is fixed to an integral web 21 connecting the cylinders. The outer ends of the cylinders 19—19' are closed by a casting 22 bolted thereto and containing a horizontal passage 23 through which the cylinders communicate.

The cylinders 19 and 19' are supplied with driving liquid from a multiple-piston, variable-displacement pump 24 of a well known type. The pump shown is fully described in the patent to Walter Ferris, No. 1,558,002, issued October 20, 1925, so that it will suffice here to state that it is driven at constant speed through appropriate means, such as a pulley 25, and that the displacement thereof may be varied at will by adjustment of a hand wheel 26. The pump discharges into and through a pipe 27 at a rate corresponding to the setting of the hand wheel 26 and receives liquid through a pipe 28. In this instance pipes 27 and 28 lead to a valve 29 of appropriate form which controls communication between them and two conduits 30 and 31 leading to the forward ends of the cylinders 19 and 19', respectively.

The valve shown in Figures 4 and 5 comprises a body portion in the form of a block 29 seated upon and fixed to a flange 32 which forms an integral connection between the conduits 30 and 31, rising from the cylinders 19 and 19' (Fig. 4). The block 29 contains a longitudinal bore 33 whose opposite ends are in open communication through a passage 34. A relatively narrow annular groove 35 in the bore 33 communicates with conduit 31 through a passage 36, and a relatively wide annular channel 37 communicates with conduit 30 through a passage 38. A groove 39, intermediate groove 35 and channel 37, communicates with the pump discharge pipe 27 through a passage 40, and a passage 41 maintains communication between one end of the bore 33 and the pipe 28 which leads back to the pump. A valve plunger 42, reciprocable in the bore 33, is formed with a relatively wide head 43, which cooperates with the groove 35, and a relatively narrow head 44, which cooperates with the channel 37.

The valve plunger 42 may assume either of three positions. In the intermediate or neutral position of Figure 4, the groove 39 communicates through channel 37 with the right end of the bore 33 so that pump discharge pipe 27 communicates with the return pipe 28, through passage 40, groove 39, channel 37, and passages 34 and 41, and the pump circuit is by-passed. In this neutral position cylinder 19 is open to the channel 37 through conduit 30 and passage 38, but the passage 36, leading to conduit 31 of cylinder 19', is blocked by reason of the closure of groove 35 by the head 43. It will thus be noted that the motor circuit, including conduit 31, cylinder 19', passage 23, cylinder 19, and conduit 30, is blocked by the head 43 and both pistons 18 and 18' are at rest. When the valve plunger 42 is shifted into the left extreme position, shown in full lines in Figure 5, head 44 blocks communication between groove 39 and channel 37, and groove 35 is opened to groove 39 so that the entire discharge from the pump is directed through conduit 31 to the inner end of cylinder 19'. The piston 18' and draw-head 14' are thus driven toward the right at a rate corresponding to pump displacement. The draw-head 14' thus performs a cutting stroke. The liquid discharged from the outer end of cylinder 19' passes through passage 23 into the outer end of cylinder 19, thereby causing piston 18 and drawhead 14 to travel toward the left at the same rate as piston 18' and draw-head 14'. The draw-head 14 thus performs a return stroke. During this movement the liquid discharged from the inner end of cylinder 19 escapes through conduit 30, passage 38, channel 37, passages 34 and 41, and pipe 28 back to the pump. When the valve plunger 42 is shifted into the right extreme position, shown in dotted lines in Figure 5, communication is established between groove 35 and the left end of bore 33, and between groove 39 and channel 37, so that the motion of the pistons 14 and 14' is reversed. The entire discharge of the pump is directed through groove 39, channel 37, passage 38 and conduit 30 into the inner end of cylinder 19, causing the piston 18 and draw-head 14 to travel toward the right on a cutting stroke, the discharge from the outer end of cylinder 19 entering the outer end of cylinder 19', causing the piston 18' and draw-head 14' to travel toward the left on a return stroke, and the discharge from the inner end of cylinder 19' returning to the pump through the conduit 31, groove 35, passage 41, and pipe 28.

The valve plunger 42 is actuated and controlled by an appropriate stem 45 which in turn is preferably placed under the control of mechanism automatically operable to bring the machine to rest at the end of the cutting stroke of each draw-head. In this instance the stem 45 carries a grooved collar 46 operatively engaged with the upper end of a lever 47. The lever 47 is fulcrumed intermediate its ends upon a pivot pin 48 fixed in an appropriate bracket 49. The lower end of lever 47 is connected through a link 50 with an upright crank arm 51 fixed to the end of a rock shaft 52. Shaft 52 is journaled at one end in the face plate 12 and projects through the vertical plate 13 in which it is also journaled. An appropriate trigger 53 is adjustably fixed to shaft 52. In this instance the trigger depends from a split sleeve 54 releasably clamped upon the rod and is formed with a pointed head 55 for cooperation with cam lugs 56 and 56' which project laterally from the respective draw-heads 14 and 14'. The rock shaft 52 also carries an appropriate hand lever 57 and is also controllable from a pair of double-ended treadles 58 and 59 rockably supported near the base of the machine. One treadle 58 is connected through a link 60 with one end of a lever 61 fixed to the shaft 52 while the other is similarly connected through a link 62 with the other end of lever 61. The arrangement is such that an operator at one side of the machine may rock the shaft 52 in one direction or the other by depressing the adjacent end of one or the other of the pedals, and when positioned at the opposite side of the machine he may effect a similar action by depressing the then adjacent end of one or the other of the pedals.

The operation of the machine will now be briefly described. Let it be assumed that the parts are in the positions shown, with draw-head 14' in position to begin a cutting stroke, draw-head 14 in position to begin a return stroke, the trigger 53 in vertical neutral position so that valve plunger 42 is in the neutral position of Figure 4, and that the pump 24 is in operation and delivering liquid through pipe 27 at a rate corresponding to the setting of the hand wheel 26. With the valve plunger 42 in neutral position the pump circuit is by-passed and the pistons 18—18' and draw-heads are at rest. After entering the tool through the work and attaching it to the draw-head 14' in the usual manner the operator rocks the shaft 52 clockwise (Fig. 4) by depressing one or the other of the treadles or by manipulating the hand lever 57 so as to shift the valve plunger 42 into the position shown in full lines in Figure 5. The pump delivery pipe 27 is thus connected through pipe 31 to the inner end of cylinder 19', the inner end of cylinder 19 is connected through pipe 30 to the return pipe 28, and the pistons 18 and 18' and drawheads 14 and 14' travel in opposite directions in the manner hereinabove described. This motion continues until piston 18 has reached the inner end of cylinder 19 and until the cam lug 56' on the draw-head 14' has engaged the head 55 of the trigger 53 and, by its advance, forced the trigger into the vertical neutral position of Figure 4. This action of the trigger returns the valve plunger 42 into the neutral position of Figure 4 and the machine again comes to rest, with the draw-head 14 in position to start a cutting stroke and the draw-head 14' in position for a return stroke. To perform the next cutting stroke the operator rocks the shaft 52 in a counter-clockwise direction (Fig. 4) thereby shifting the valve plunger 42 into the dotted line position of Figure 5 and thereby connecting the inner end of cylinder 19 with the pipe 27 and the inner end of cylinder 19' with pipe 28. Draw-head 14 then performs a cutting stroke while draw-head 14' performs a return stroke, this motion continuing until piston 18' has reached the inner end of cylinder 19' and until the trigger 53 has again been returned to neutral position by the action of the cam lug 56 against the trigger head 55. This action again returns the valve plunger 42 to neutral position and the machine again comes to rest with the parts in the positions shown.

From the foregoing it will be noted that the two cylinders 19 and 19' are connected in series so that the liquid discharge by one cylinder, during the cutting stroke of its cooperating piston, serves as a driving medium for the other piston during the return stroke thereof. The relative positions of the two pistons is thus determined by the volume of liquid contained in the outer ends of the cylinders and the connecting passage 23, and any material variation in this volume, due to leakage or slippage, would of course destroy proper coordination between the pistons. To overcome this difficulty provision is made for recoordinating the pistons at the end of each cutting stroke. In the machine shown this is accomplished by connecting a pressure relief valve 63, of appropriate form, to the passage 23, by forming a passage 64—64' through each piston, the flow through each passage being greatly restricted by an appropriate coil of small tubing 65—65'. During the cutting stroke of each piston the marked difference in the liquid pressures at the opposite sides thereof causes a minute flow of liquid through the passage and coil into the outer end of the cylinder, which increases the volume of liquid within the outer ends of the cylinders and causes the other piston to reach the end of its return stroke before the first mentioned piston has completed its cutting stroke. After the motion of the returning piston is arrested by striking the end of its cylinder, or otherwise, the excess liquid within the ends of the cylinders is forced out through the relief valve 63 by the continued advance of the working piston until that piston reaches the end of its working stroke. The pistons are thus automatically coordinated at the end of each cycle and are in proper position for the next cycle. A drain pipe 66 is preferably provided for directing the discharge from the relief valve 63 to a sump ordinarily provided in the base of the pump casing.

In order to avoid forcing liquid through the relief valve 63 at the end of each stroke for the purpose above described, a piston controlled outlet may be provided for each cylinder through which any surplus liquid may escape when the piston reaches the end of its return stroke. Ports for this purpose are shown at 67 and 67'. In this instance each outlet is connected through a pipe 68—68' with the extreme inner end of each cylinder, a check valve 69—69' being inserted in each pipe to prevent flow therethrough except from the outer to the inner end of the associated cylinder. The arrangement is such that as each piston on its return stroke passes over and beyond the port 67 or 67' the outer end of the associated cylinder is opened to the inner end thereof, the piston comes to rest, and any excess liquid in the outer ends of the cylinders escapes through this port as the other piston completes its cutting stroke.

The length of each cutting stroke may be varied at will by adjusting the trigger 53 lengthwise of the shaft 52. Such adjustments however require a variation in the volume of liquid within the outer ends of the cylinders 19 and 19' in order to effect the complete return of each piston 18—18' and draw-head 14—14' into proper position to begin a working stroke. To this end a pipe 70 is connected to the passage 23 through which liquid may be supplied or withdrawn from the outer ends of the cylinders. In this instance pipe 70 is connected to the pump delivery pipe 27 and is controlled by a valve 71 which is closed during normal operation of the machine. The machine is ordinarily adjusted at a time when the drawhead 14' is in the fully advanced position shown, and with the valve plunger 42 in the neutral position of Figure 4. In this position of the control valve the pump circuit is by-passed and the inner end of cylinder 19 is open to the pump circuit, as above pointed out, so that when valve 71 is opened to thereby open the outer end of the cylinder 19 to the pump circuit, the piston 18 and draw-head 14 are free to be adjusted by hand into any position along the trough 11. To adjust the stroke of the machine therefore, the trigger 53 is adjusted along the shaft 52 and fixed in position to mark the end of the desired stroke, the valve 71 is opened, and the draw-head 14 is adjusted into the new position to effect proper coaction between the cam lug 56 and the head 55 of the trigger, after which the valve 71 is again closed and the machine is ready for operation.

Various changes may be made in the embodiment of the invention hereinabove specifically described without departing from or sacrificing the advantages of the invention as defined in the appended claims.

I claim:—

1. In a hydraulic broaching machine the combination of a pair of separate tool driving members, each movable in one direction to effect a working stroke and in the opposite direction to effect a return stroke, a pair of motor cylinders, each of said motor cylinders being separably connected to one of said members to drive the same, a hydraulic pump, means for directing driving liquid from said pump to one end of each of said motor cylinders alternately to cause said members to alternately execute working strokes, a hydraulic connection between the other ends of said motor cylinders through which each is energized by liquid discharged from the other to effect a return stroke of each of said members during the working stroke of the other, and means for automatically supplying liquid to said connection to compensate for leakage losses and to thereby maintain proper working relation between said members.

2. In a hydraulic broaching machine the combination of a pair of separate tool driving members, each movable in one direction to effect a working stroke and in another direction to effect a return stroke, a pair of motor cylinders, each of said cylinders being separately connected with one of said members to drive the same, a hydraulic pump, means for directing driving liquid from said pump to one end of each of said motor cylinders alternately to cause said members to alternately execute working strokes, a hydraulic connection between the other ends of said motor cylinders through which each is energized by liquid discharged from the other to effect a return stroke of each member during the working stroke of the other, means for automatically supplying liquid to said connection to compensate for leakage losses and to thereby maintain a predetermined working relation between said members, and means for regulating the amount of liquid within said connection to thereby regulate the working relation between said members.

3. In a hydraulic broaching machine the combination of a pair of separate tool driving members, each movable in one direction to effect a working stroke and in the opposite direction to effect a return stroke, a pair of motor cylinders, each of said motor cylinders being separately connected to one of said members to drive the same, means for supplying driving liquid to one end of each of said motor cylinders alternately to cause said members to alternately execute working strokes, a hydraulic connection between the other ends of said motor cylinders through which each is energized by liquid discharged from the other to effect and complete a return stroke of each of said members during and prior to completion of the working stroke of the other member, means for limiting the return stroke of each of said members, control means automatically operable in response to movement of said members to limit the working stroke of said members, said control means being adjustable to predetermine the end of the working stroke, and means for regulating the amount of liquid in said hydraulic connection to insure completion of the return strokes of said members when said control means is adjusted.

4. In a hydraulic broaching machine, the combination of a tool driving member, a hydraulic motor for driving said member, a variable displacement hydraulic pump, means for delivering the entire discharge from said pump to said motor to drive said motor and member at a predetermined rate in one direction to effect a working stroke, a second tool driving member, a second hydraulic motor for driving said second member, means for delivering the entire discharge from said pump to said second motor to drive the same and said second member at a predetermined rate in one direction to effect a working stroke, and means automatically operable to drive each of said motors and its driven member in an opposite direction and to a predetermined point during operation of the other motor and its driven member in the direction first named.

5. In a hydraulic broaching machine the combination of a tool driving member, a hydraulic motor for driving said member, a variable displacement hydraulic pump, means for delivering the entire discharge from said pump to said motor to drive said motor and member at a predetermined rate in one direction to effect a working stroke, a second tool driving member, a second hydraulic motor for driving said second member, means for delivering the entire discharge from said pump to said second motor to drive the same and said second member at a predetermined rate in one direction to effect a working stroke, and means energized by the working stroke of each of said members for driving the other member in an opposite direction and to a predetermined point to effect a return stroke.

6. In a hydraulic broaching machine the combination of a tool driving member, a hydraulic motor for driving the same, a variable displacement hydraulic pump, means for delivering the entire discharge from said pump to said motor to drive said motor and member at a predetermined rate in one direction to effect a working stroke, a second tool driving member, a second hydraulic motor for driving said second member, means for delivering the entire discharge from said pump to said second motor to drive the same and said second member at a predetermined rate in one direction to effect a working stroke, and hydraulic means energized by the working stroke of each of said members for driving the other member in an opposite direction and to a predetermined point to effect a return stroke.

In witness whereof, I hereunto subscribe my name this 6th day of October, 1927.

JOHN P. FERRIS.